Dec. 9, 1969   R. D. CHAPIN ET AL   3,482,785
TUBE POSITIONER WITH FLOW REGULATING MEANS
Filed Feb. 16, 1968
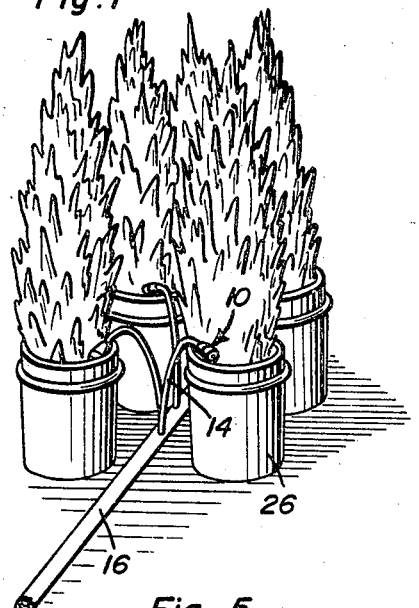
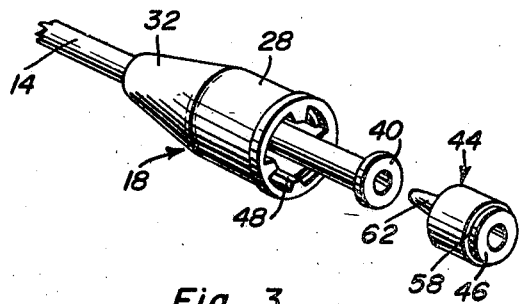
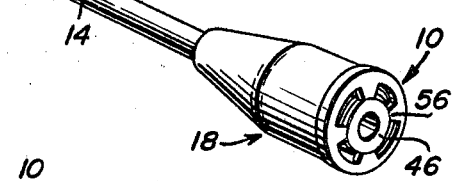
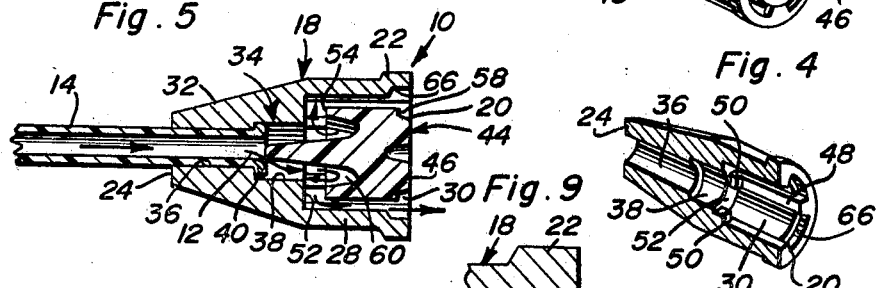
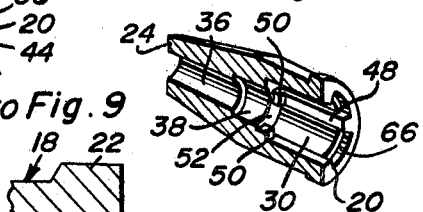
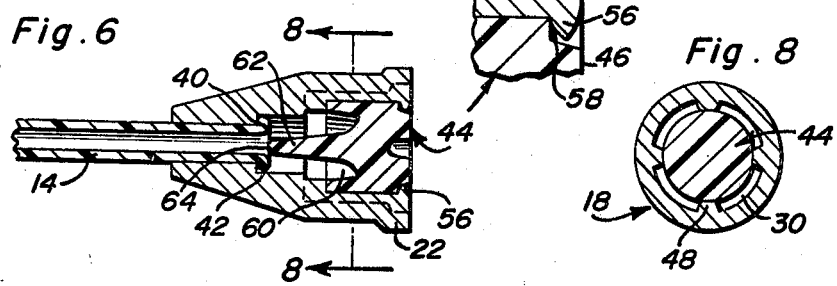
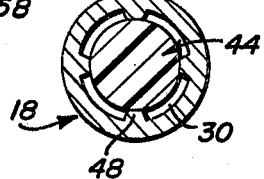
Richard D. Chapin
Robert E. Chapin
INVENTORS
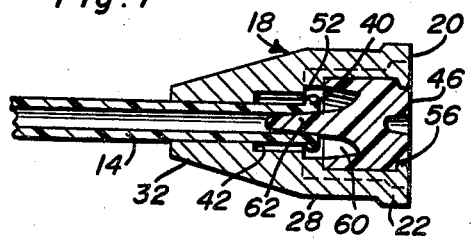

United States Patent Office 3,482,785
Patented Dec. 9, 1969

3,482,785
TUBE POSITIONER WITH FLOW REGULATING MEANS
Richard D. Chapin, 368 N. Colorado Ave., Watertown, N.Y. 13601, and Robert E. Chapin, Watertown, N.Y. (2 Elm St., Potsdam, N.Y. 13676)
Filed Feb. 16, 1968, Ser. No. 705,972
Int. Cl. B05b 15/06; A01q 25/00, 27/00
U.S. Cl. 239—542      11 Claims

ABSTRACT OF THE DISCLOSURE

A weight mounted on the discharge end of a leader tube for maintaining this end in watering communication with a plant. The weight incorporates a valving element for selectively allowing and preventing the flow of water from the leader tube, this member also incorporating a water diffusing configuration to provide a gentle non-eroding flow of water from the discharge end of the tube through the weight itself.

---

The instant invention is generally concerned with plant watering systems, and more particularly relates to a novel means for positioning the discharge ends of individual leader tubes and controlling the flow of water therethrough.

It is a primary object of the instant invention to provide a tube positioning weight which not only functions so as to retain the discharge end of a leader tube adjacent a plant, as in applicant's Patents 3,199,784 and 3,199,791, but also forms an effective means for controlling the flow of water from the leader tube.

In conjunction with the above object, it is particularly significant to provide a leader tube positioning weight which incorporates means functioning as a simple off-on control for the flow of water whereby the flow of water through any tube from which the associated plant has been removed can be discontinued. In this manner, both an unnecessary waste of water and a possible flooding of the involved area can be prevented. Inasmuch as systems as herein under consideration will conceivably be used in conjunction with thousands of potted plants, it will be appreciated that the ability to control the flow of water through each leader tube directly at the discharge end of the tube itself, without affecting the flow through the remaining tubes, is especially desirable.

In addition, inasmuch as the flow can be individually discontinued through each leader tube, which in turn enables the cutting off of the flow through any tube upon removal of the corresponding pot, greater flows can be utilized, through either increased pressure or larger tubes, in that any flow not specifically directed to a container or otherwise defined plant area, can be immediately discontinued without affecting the remainder of the system.

Also of significance is the provision of a flow control directly within the positioning weight which can be operated through a simple manipulation of the tube and weight either when being removed from the potted plant or introduced thereto for the purpose of either commencing or discontinuing the flow.

Likewise, it is of significance that the valve member be so formed as to effect a complete diffusion of the water as it flows through the weight so as to enable even a large volume of water to gently flow from the tube.

Furthermore, it is an important object of the instant invention to provide a tube positioner and flow control unit which is simple in construction, easy to mount, and both economical and highly efficient in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view generally illustrating one use of a system incorporating the positioner of the instant invention;

FIGURE 2 is an exploded perspective view of the elements of the positioner and the discharge end of a leader tube on which the positioner is mounted;

FIGURE 3 is a perspective view of the tube assembled positioner;

FIGURE 4 is a perspective view in cross-section of the main body of the positioner;

FIGURE 5 is an enlarged cross-sectional view through the assembled positioner with the valve block retracted so as to enable a diffused flow of water;

FIGURE 6 is a view similar to FIGURE 5 with the positioner rotated approximately 45°;

FIGURE 7 is a perspective view similar to FIGURE 6 with the valve in flow discontinuing relation with the discharge end of the leader tube;

FIGURE 8 is a cross-sectional view taken substantially on a plane passing along line 8—8 in FIGURE 6; and FIGURE 9 is an enlarged cross-sectional detail illustrating the manner in which the valve or valve block is retained within the body of the positioner.

Referring now more specifically to the drawings, reference numeral 10 is used to generally designate the tube positioner comprising the instant invention. This positioner 10 is particularly adapted for mounting on the discharge end 12 of a flexible leader tube 14 which in turn will, in conjunction with a plurality of similar positioner mounting tubes 14, be mounted on and in flow receiving communication with a main line or tube 16 communicated with a source of water under pressure.

The tube positioner 10 includes an elongated body 18, preferably of lead or other similar material possessing sufficient inherent weight so as to in effect immobilize the discharge end portion 12 of the corresponding leader tube 14 against the tendency for the leader tube to move as the water is flowing therethrough. The body 18, inward from the flat first or discharge end 20 thereof, is, aside from an outwardly projecting annular flange 22 about said first end 20, cylindrical in configuration for approximately half the length thereof, the body 18 then conically tapering to a flat second or intake end 24. This particular external configuration provides for an enlarged discharge end 20 in conjunction with a tapering body which, at the intake end 24, approaches the diameter of the tube 14 so as to allow for the positioner 10 to slip easily from a pot 26 or the like upon merely removing the pot 26. Internally, the cylindrical portion 28 of the body 18 defines an enlarged chamber 30 which opens directly through the discharge end 20, while the conical portions 32 defines a stepped reduced diameter passage 34 axially therethrough between the intake end 24 and the inner end of the enlarged chamber 30. The passage 34 includes an outer length or portion 36 of a diameter so as to closely although slightly receive the leader tube 14 therethrough, while the inner length or portion 38 of the passage 34 is diametrically enlarged, although still of a size appreciably smaller than the main chamber 30, for the accommodation of the retaining flange 40 provided on the discharge end 12 of the tube 14 which acts so as to mount the positioner 10 on the tube 14. The actual formation of retaining flange 40 can be simply accomplished by positioning the discharge end 12 of the leader tube 14, formed of an appropriate thermoplastic material, adjacent a source of heat which will produce a radial outward flowing of the material into the configuration illustrated, at the same time forming a slightly enlarged or funnelshaped tube mouth at the discharge end 12. As will be appreciated from the drawings, the retaining flange 40 seats on the annular shoulder 42 defined between the passage lengths 36 and 38 and is free to move inwardly of the positioner body 14 relative to the shoulder 42.

A cylindrical flow control block or valve member 44 is received within the chamber 30 with the flat outer end 46 thereof substantially coplanar with the flat discharge end 20 of the body 18. The member 44 is of a reduced diameter relative to the chamber 30 and is centrally located therein by means of a plurality, normally four, of radially inwardly projecting ribs or fins 48 projecting into the chamber 30 at equally spaced points thereabout, each pair of adjacent ribs forming in effect a flow passage between the chamber wall and the inwardly positioned block or member 44. Each of the ribs 48 includes, at the inner end thereof, an inwardly directed seat 50 offset upwardly from the inner end wall 52 of the chamber 30, such seat 50 receiving the inner end 54 of the member 44 so as to maintain the member 44 in spaced relation relative to the inner wall 52 of the chamber 34, thus in effect continuing the flow passages through the chamber 30 and into the enlarged passage section 38 so as to enable a flow of water from the corresponding leader tube 14 completely through the positioner 10.

The block 44 is to be locked into position within the cylindrical portion 28 of the body 18 by inwardly swaging the outer end of each of the ribs 48, as generally indicated by reference numeral 56. This inwardly swaged outer end of each of the ribs 48 will be received within an annular recess or shoulder 58 defined about the outer end of the block 44 adjacent the front end 46. Upon a swaging of the portion 56 of the ribs 48, it will be appreciated that the block or member 44 is rigidly locked into position with the inner end 54 thereof seated on the inner rib seats 50.

The inner end of the flow control block 44 has an enlarged relatively deep annular depression or recess 60 defined therein, this recess 60 surrounding a centrally located outwardly projecting generally conical plug or valve projection 62 which terminates in a slightly rounded relatively small leading end 64. As will be appreciated from the drawings, the conical projection 62, at the inner end thereof, curls laterally and terminates at the lower end of the outer wall of the recess 60 which in turn tapers laterally outwardly toward the flat inner end 54 of the block 44. With this configuration, noting FIGURE 5, it will be appreciated that the water flowing through the leader tube 14 will follow a sinuous path through the positioner 10 so as to effect a diffusing of the stream of water and the discharge of the water in a non-eroding manner.

The outer end of the valve projection 62, when the tube flange 40 is seated on the shoulder 42, is spaced relative to the discharge end 12 of the tube 14 as to allow for a free flow of water therefrom as suggested by the arrows in FIGURE 5. However, when the flow of water is to be stopped, either the tube 14, or the positioner 10, or both, are moved inwardly relative to the other so as to forcibly position the valve projection 62 within the discharge end 12 of the tube 14 as suggested in FIGURE 7. This positioning of the projection 62 is facilitated both by the slight funnel-shape of the discharge end 12 and by the tapered nature of the projection 62 itself. Further, the tube 14 will also possess a slight inherent resiliency due to the nature of the material used, this also facilitating a water flow sealing reception of the projection 62 within the discharge end 12. In actuality, it is the leader tube 14 which moves inwardly onto the projection 62 with the tube flange 40 rising from the passage shoulders 42 toward and about the projection 62 which, through the locking of the block 44 within the chamber 30, is fixed relative to the positioner body 18. Finally, it will be noted that the outer end portion of the wall of the chamber 30 is slightly outwardly offset as at 66, following generally the contour of the body flange 22, this outwardly offset portion 66, in conjunction with the annular block recess 58, forming a slight enlargement of the flow passages defined by the block centering ribs 48 at the discharge end thereof to facilitate the diffusion of the flow and avoid any earth eroding forced projection of the water.

From the foregoing, it will be appreciated that a highly unique tube positioner has been defined, this positioner incorporating a flow control whereby the flow from a leader tube can be shut off or turned on through merely a longitudinal movement of the positioner relative to the associated leader tube, such being simply accomplished utilizing either one or two hands as the tube is being either positioned within a pot or removed therefrom. With such a positioner associated with each of the leader tubes in a watering system, it will be appreciated that the pots can be removed at will and the water from the associated leader tubes immediately cut off without disrupting the flow to the remaining pots, this flow being turned back on upon a repositioning of the pot or the introduction of a new pot.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A tube positioner for use in a water distributing system comprising a body defining an internal chamber, a tube passage extending from one end of said chamber through said body and communicating said chamber with the exterior of said body for the reception of a water tube therethrough directed into said chamber, said chamber having at least a portion thereof opening through said body in spaced relation to the passage whereby the flow of water from a tube received in said passage will move through said chamber and out said portion, and a flow control member in said chamber inward of said passage, said control member including valve means directed toward said passage and selectively engageable in sealing relationship with the inner end of a tube received within said passage upon a longitudinal movement of the received tube inward relative to the valve means.

2. The device of claim 1 wherein said chamber includes a peripheral wall, said member being positioned generally centrally within said chamber in spaced relation to a substantial portion of the chamber wall to define a flow path therebetween.

3. The device of claim 2 including peripherally spaced inwardly projecting ribs on the chamber wall defining means centrally locating said member within said chamber.

4. The device of claim 3 wherein the opposite ends of said ribs are inwardly directly and engage the opposite ends of said member and retain said member therebetween in spaced relation forward of the inner end of said chamber to allow for a flow path between said member and the inner end of said chamber.

5. The device of claim 4 wherein said valve means comprises an elongated conical projection projecting axially from the inner end of said member for selective reception within a passage received tube upon a longitudinally inward movement of a received tube toward said valve means.

6. The device of claim 5 including an inwardly directed annular recess in said member about said conical projection defining a sinuous flow path for water introduced from a received tube.

7. The device of claim 1 wherein said valve means comprises an elongated conical projection projecting axially from the inner end of said member for selective reception within a passage received tube upon a longitudinally inward movement of a received tube toward said valve means.

8. The device of claim 7 including an inwardly directed annular recess in said member about said conical projection defining a sinuous flow path for water introduced from a received tube.

9. A watering system including an elongated water feeding tube and a positioning means therefor, said positioning means comprising a body, said body defining an internal chamber, a tube passage extending through said body and into said chamber, one end portion of said tube being received within said passage, said one end portion having retaining means thereon, said passage having a seating shoulder therein receiving said retaining means for retaining said tube against withdrawal therefrom, said passage inward of said shoulder being enlarged so as to enable an inward sliding of the one end portion of the tube toward said chamber, said chamber having a portion opening outwardly through said body in spaced relation to said passage, flow control means mounted in said chamber in alignment with said passage, said flow control means including a valve portion directed toward said passage and the one end portion of said tube for sealing engagement with said one end portion upon an inward movement of said one end portion against said valve portion, and means defining a flow path between said passage and the outwardly opening portion of said chamber upon a withdrawal of the one end portion of the tube from the valve portion.

10. The system of claim 9 wherein said retaining means comprises an integral outwardly directed flange formed on said tube.

11. In a plant watering system, a main water line, a plurality of elongated flexible leader tubes extending therefrom, a combination tube positioning weight and flow control associated with the outer end of each tube, said combination weight and flow control comprising a weight body, flow passage means defined through said body, a tube disposed in said flow passage means for limited longitudinal movement therein, and valve means fixed in said flow passage means for selective sealing engagement with said tube end portion upon longitudinal movement of said tube, said valve means being so oriented in said flow passage means as to retain a flow path thereabout, said flow path enlarging beyond said valve means and communicating with the exterior of said body.

References Cited
UNITED STATES PATENTS

| | | | |
|---|---|---|---|
| 3,199,791 | 8/1965 | Chapin | 239—542 |
| 3,430,867 | 3/1969 | Rodgers et al. | 239—542 |

M. HENSON WOOD, JR., Primary Examiner

MICHAEL Y. MAR, Assistant Examiner

U.S. Cl. X.R.
47—38; 251—347